3,121,792
METHOD OF DENSITY DIFFERENTIATION IN RADIOGRAPHY
Georg S. Mittelstaedt, 274 73rd St., Brooklyn, N.Y.
No Drawing. Filed Apr. 18, 1961, Ser. No. 113,582
6 Claims. (Cl. 250—65)

This invention relates to radiography, and particularly relates to the singling out of defects in relatively dense areas of nearly equal opacity.

For instance, the liver and surrounding organs constitute a relatively dense mass of nearly equal opacity to penetrating radiation, and it is well known that malignancies in this area, such as small cancers and abscesses do not show on ordinary radiograph.

It is therefore an object of this invention to define the density differentiation in areas of nearly uniform opacity, which includes the singling out of cancers, abscesses and of other defects about the liver and other organs.

Other objects of this invention are to improve radiographs, to improve density separation, to improve contrast and definition of detail, to single out defects, and to single out the densest spots in dense areas.

These and other objects will become apparent in the description below.

The above objects are accomplished by "burning" and reversing the radiograph. That is, the radiographic negative is "burned" and an image is produced from the "burned" negative.

In the text and claims, by "burning" photographic film is meant excessive or overexposure through an object to penetrating radiation, also in association with intensifying means.

As an example of the invention, a sensitive photographic element is exposed to penetrating radiation through an object to a degree in which after development most of the image is black, or opaque to visible light, and only the densest spots of the object appear somewhat lighter. The positive is produced by exposing a sensitive photographic layer to light through the burned negative. After development, the positive will show the densest spots of the object only.

In the described radiographic negatives, the inherent density contrast increases with increased exposure to penetrating radiation through an object, and in another example, for defining fine density variations in areas of nearly uniform opacity, the radiographic negative is exposed to a degree in which after development the whole image appears black. The positive is produced by exposing a sensitive photographic layer to penetrating radiation through the burned negative, also in combination with intensifying screens or other intensifying means. The positive will define the different silver densities inherent in the burnt negative. With selective use of soft penetrating radiation, controlled exposure and low response intensifying screens, the positive will show the densest spots of the object only.

This invention may be used in connection with density analyses, in which successive films define different density ranges. In this application of the invention, at least one of the separation negatives is burned, and a positive is produced from the burned negative for defining the density differentiations inherent therein.

In the text and claims, by "penetrating radiation" is meant X-rays, alpha, beta, gamma rays, neutrons, partly penetrating radiation, converted penetrating radiation, etc.

In the text and claims, by "light" is means visible and/or invisible radiation; by "photographic film," "light sensitive layer" or "ray sensitive layer" is also meant any ray sensitive surface, material or recording means; the terms "positive" and "negative" are also meant to be used in reversed order.

The principles involved in this invention may be applied to all fields of radiology.

Changes may be made without departing from the spirit or scope of this invention.

I claim:

1. Radiographic method consisting in exposing sensitive photographic film to penetrating rays through an object until the film is burned, developing the burnt film and projecting light radiaton to a sensitive photographic element through the burned film.

2. Radiographic method consisting in exposing sensitive photographic film to penetrating rays through an object until the film is burned, developing the burnt film, projecting soft penetrating radiation to a sensitive photographic element through the burned film, and providing a low response intensifying screen in association with said sensitive photographic element.

3. The method of defining an overexposed radiographic film produced by exposing the film to penetrating rays through an object until the film is burned and developing the burnt film, consisting in projecting light radiation to a sensitive photographic element through the overexposed film.

4. The method of defining an overexposed radiographic film produced by exposing the film to penetrating rays through an object until the film is burned and developing the burned film, consisting in projecting soft penetrating radiation to a sensitive photographic element through the overexposed film and providing a low response intensifying screen in association with said sensitive photographic element.

5. In combination with a method for producing, with penetrating radiation emanating from a suitable source, a radiograph, normally comprising exposing a photographic film to the penetrating rays through an object until the film is burned, developing the burnt film and exposing a sensitive photographic element to light rays through the developed film, the improvement consisting in projecting light rays through the developed burned film and upon the sensitive photographic element.

6. In combination with a method for producing with penetrating radiation emanating from a suitable source, a radiograph, normally comprising exposing a photographic film to the penetrating rays through an object until the film is burned, developing the burned film and exposing a sensitive photographic element to light rays through the developed film, the improvement consisting in irradiating said sensitive photographic element with light rays through the developed burned film.

References Cited in the file of this patent

UNITED STATES PATENTS

| | | |
|---|---|---|
| 2,844,732 | Hartmann | July 22, 1958 |
| 2,906,881 | Mittelstaedt | Sept. 29, 1959 |
| 2,931,904 | Fine | Apr. 5, 1960 |

UNITED STATES PATENT OFFICE
CERTIFICATE OF CORRECTION

Patent No. 3,121,792 February 18, 1964

Georg S. Mittelstaedt

It is hereby certified that error appears in the above numbered patent requiring correction and that the said Letters Patent should read as corrected below.

Column 1, line 15, after "on" insert -- an --; column 2, line 3, for "means" read -- meant --.

Signed and sealed this 30th day of June 1964.

(SEAL)
Attest:

ERNEST W. SWIDER
Attesting Officer

EDWARD J. BRENNER
Commissioner of Patents